US 6,636,175 B2

(12) United States Patent
Russell et al.

(10) Patent No.: US 6,636,175 B2
(45) Date of Patent: Oct. 21, 2003

(54) METHOD AND APPARATUS FOR ACQUIRING A REMOTE POSITION

(76) Inventors: Paul Grady Russell, 1955 Palo Santo Dr., Campbell, CA (US) 95008; Deborah L. Schultz, 950 Lantana Dr., Sunnyvale, CA (US) 94086

(*) Notice: Subject to any disclaimer, the term of this patent is extended or adjusted under 35 U.S.C. 154(b) by 0 days.

(21) Appl. No.: 09/952,887

(22) Filed: Sep. 14, 2001

(65) Prior Publication Data

US 2003/0052815 A1 Mar. 20, 2003

(51) Int. Cl.[7] ............................................. H04B 7/185

(52) U.S. Cl. ......................... 342/357.1; 342/357.08; 342/357.09

(58) Field of Search ................. 342/357.08, 357.09, 342/357.1

(56) References Cited

U.S. PATENT DOCUMENTS

| | | | | | |
|---|---|---|---|---|---|
| 5,751,246 | A | * | 5/1998 | Hertel | 342/357.07 |
| 6,091,957 | A | * | 7/2000 | Larkins et al. | 455/456 |
| 6,246,376 | B1 | * | 6/2001 | Bork et al. | 342/357.13 |
| 6,373,430 | B1 | * | 4/2002 | Beason et al. | 342/357.09 |
| 6,374,179 | B1 | * | 4/2002 | Smith et al. | 342/357.1 |
| 6,377,210 | B1 | * | 4/2002 | Moore | 342/357.1 |
| 6,380,890 | B1 | * | 4/2002 | Smith et al. | 342/357.09 |
| 6,430,498 | B1 | * | 8/2002 | Maruyama et al. | 342/357.01 |
| 6,504,503 | B1 | * | 1/2003 | Saint-Hilaire et al. | 342/357.09 |
| 6,560,461 | B1 | * | 5/2003 | Fomukong et al. | 342/357.09 |
| 2002/0000930 | A1 | * | 1/2002 | Crowson et al. | 342/357.1 |
| 2002/0019698 | A1 | * | 2/2002 | Vilppula et al. | 342/357.08 |
| 2002/0034953 | A1 | * | 3/2002 | Tricarico | 342/357.1 |

FOREIGN PATENT DOCUMENTS

WO    WO 99/48315    * 9/1999    ............ H04Q/7/32

OTHER PUBLICATIONS

NavTalk Cellular Phone/GPS Receiver: Owner's Manual and Reference Guide, Garmin Corporation, http://www.garmin.com/manuals/63.pdf, Jan. 2000.*

FCC Adopts Rules to Implement Enhanced 911 for Wireless Services (CC Docket No. 94–102), http://www.fcc.gov/Bureaus/Wireless/News_Releases/1996/nrwl6026.txt, Jun. 12, 1996.*

FCC Requires Wireless Carriers to Forward All 911 Calls (CC Docket 94–102), http://www.fcc.gov/Bureaus/Wireless/News_Releases/1997/nrwl7048.txt, Dec. 1, 1997.*

FCC Adjusts its Rules to Facilitate the Development of Nationwide Enhanced Wireless 911 Systems, http://www.fcc.gov/Bureaus/Wireless/News_Releases/2000/nrwl0033.html, Sep. 8, 2000.*

Bluetooth—The universal radio interface for ad hoc, wireless connectivity, J. Haartsen, Ericsson Review, No. 3, p. 110–117  http://www.ericsson.com/about/publications/review/1998_03/article14.shtml, 1998.

* cited by examiner

Primary Examiner—Thomas H. Tarcza
Assistant Examiner—F H Mull (57) ABSTRACT

A method and apparatus for acquiring a remote position. The present invention allows a user to locate a remote paging device located on a person or piece of property to determine its physical position. A user contacts a position service provider, identifies a device or devices to be located and provides a password. A message is then generated to locate the remote device over a communications network. In one embodiment, a paging communications network is used. Another embodiment uses a Bluetooth communications network to contact the remote device. The position of the remote device is determined by a GPS transceiver and is sent to the position service provider. The position of the remote device is then displayed on a map for the user. The remote device can also be used to send a distress signal which will provide the position of the sender and automatically be forwarded to emergency services.

12 Claims, 6 Drawing Sheets

METHOD AND APPARATUS FOR ACQUIRING A REMOTE POSITION

FIELD OF THE INVENTION

The present invention relates to devices communicatively coupled using wireless links. In particular, the present invention pertains to a device combining two-way pager technology and GPS positioning systems, and a method for acquiring a remote position using this device.

BACKGROUND OF THE INVENTION

With the advent of precision navigation aids such as the Global Positioning System (GPS), numerous applications have been found to take advantage of its ability to precisely locate the position of a given GPS receiver anywhere in the world. GPS is a worldwide radio-navigation system formed from a constellation of 24 satellites and their ground stations. GPS uses these satellites as reference points, comparing the signals from at least 3 orbiting GPS satellites to calculate the position of a receiver with an accuracy of less than a centimeter. GPS receivers have been miniaturized to just a few integrated circuits and are becoming accessible to virtually everyone as their cost decreases. These days GPS is finding its way into cars, boats, planes, construction equipment, movie making gear, farm machinery, laptop computers, and even wrist watches.

Currently, there are a variety of services which combine the GPS with cellular telephone technology for a variety of applications. These services can, for example, track stolen automobiles or be used as an emergency beacon for injured senior citizens. These systems rely upon a monitoring service which, in the event of an emergency, will contact a family member or the service subscriber. However, this system does not provide real-time position information for third parties such as a parent trying to locate a child or a company trying to track a shipment. Furthermore, a system relying upon cellular technology is valid only within an area with cellular coverage. This means that the areas without cellular coverage have no such system to rely upon.

Paging is an inexpensive and widely used wireless communication method which allows two-way communication to portable devices commonly referred to as "pagers" utilizing radio frequencies as the method of message transmission. Pagers are basically radio receivers, tuned to a paging carrier's frequency with a unique cap code (or serial number). In the case of nationwide paging, satellite links are commonly used to provide nationwide coverage for the radio signal. Because a paging system can provide nationwide coverage, it is a better communications medium for a position device than a cellular network.

It would be advantageous then, to provide a method and apparatus that allows for acquiring a remote position that utilizes both the GPS and paging network. A further need exists for a system in which a user, upon initiating a distress signal, can contact emergency services and provide accurate position information.

SUMMARY OF THE INVENTION

Embodiments of the present invention provide a method and apparatus that allows for acquiring a remote position that utilizes both the GPS and a paging network. While meeting the above needs, the present invention further provides a system in which a user, upon initiating a distress signal, can contact emergency services and provide accurate position information.

The present invention allows a user to locate a remote paging device located on a person or piece of property to determine its physical position. A user contacts a position service provider, identifies a device or devices to be located and provides a password. A message is then generated to locate the remote device over a communications network. In one embodiment, a paging communications network is used. Another embodiment uses a Bluetooth communications network to contact the remote device. The position of the remote device is determined by a GPS transceiver and the position is sent to the position service provider. The position of the remote device is then displayed on a map for the user. The remote device can also be used to send a distress signal which will provide the position of the sender and automatically be forwarded to emergency services.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

In the following detailed description of the present invention, a method and apparatus for acquiring a remote position, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Figure 1:
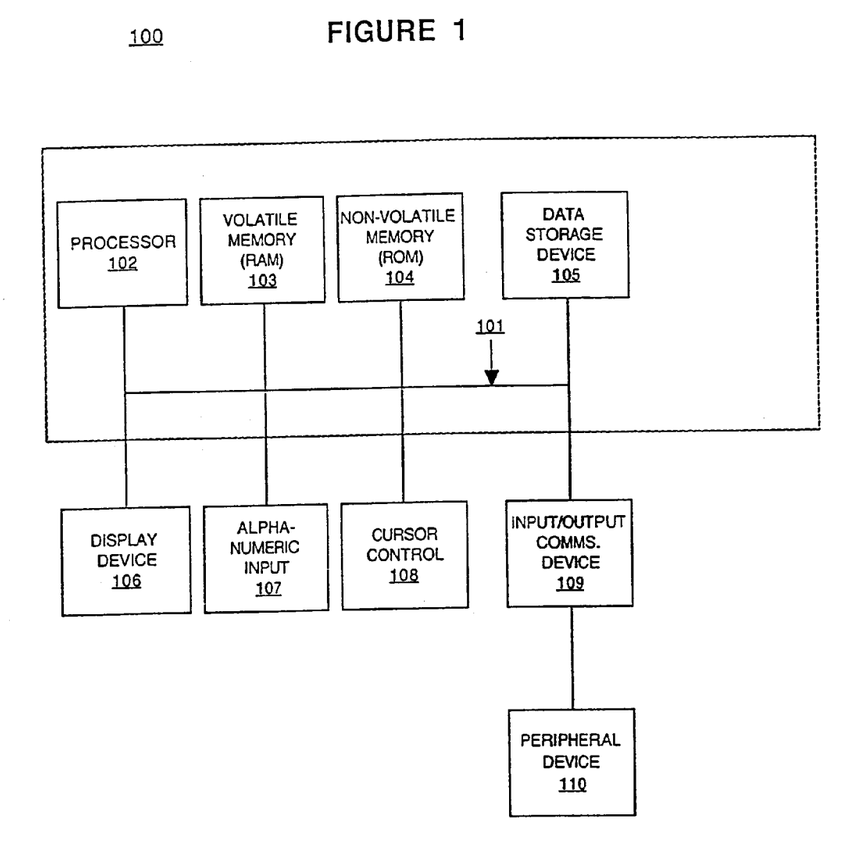
FIG. 1 is a block diagram of an exemplary computer system utilized in embodiments of the present invention.

With reference to FIG. 1, portions of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate with a number of different computer systems including general-purpose computer systems, embedded computer systems, laptop computer systems, hand-held computer systems, and stand-alone computer systems.

In the present embodiment, computer system 100 includes an address/data bus 101 for conveying digital information between the various components, a central processor unit (CPU) 102 for processing digital information and instructions, a volatile memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing vast amounts of data.

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Returning still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner displacement. Alternatively, it will be appreciated that a cursor can be directed and/or activated via input from alpha-numeric. input 107 using special keys and key sequence commands. Alternatively, the cursor may be directed and/or activated via input from a number of specially adapted cursor directing devices.

Furthermore, computer system 100 can include an input/output (I/O) communications device (e.g., interface) 109 for interfacing with external devices 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g., initiating a position query or displaying a map showing the determined position of a remote paging device, etc.).

Figure 2:
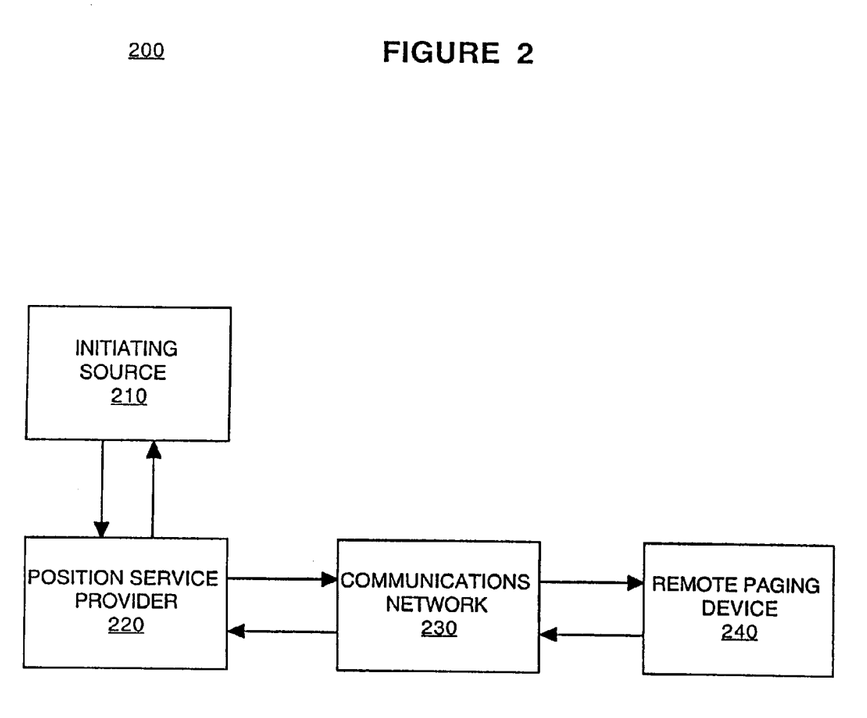
FIG. 2 is a block diagram that illustrates an initiating source, a position service provider, and a communications network that are communicatively coupled to a remote paging device in accordance with one embodiment of the present invention.
Figure 3:
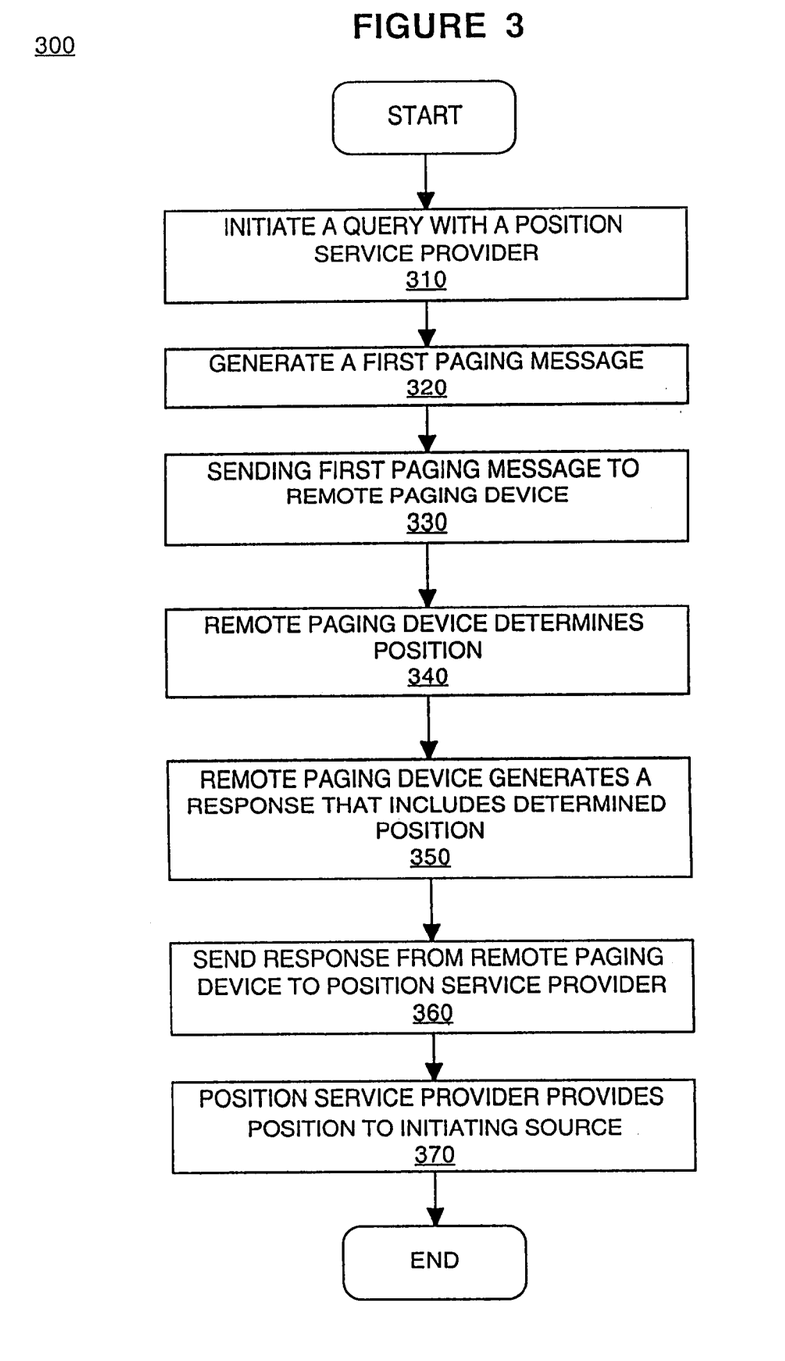
FIG. 3 is a flowchart of the steps involved in a remote position acquisition process in accordance with one embodiment of the present invention.

FIG. 2 is a block diagram of an exemplary remote position acquisition system 200 utilized in embodiments of the present invention as set forth in flow chart 300 of FIG. 3. System 200 comprises an initiating source 210 for initiating a position query and displaying position information, position service provider 220 for generating and sending a message for position information, and communications network 230 for communicatively coupling position service provider 220 with a remote paging device 240 which is operable for determining its position and sending its determined position to initiating source 210.

Flow chart 300 of FIG. 3 illustrates a method for acquiring a remote position in accordance with one embodiment of the present invention. In flow chart 300, remote paging device 240 determines its position and sends its position back to the position service provider when it receives a properly addressed message. For purposes of clarity, the following discussion will utilize the block diagram of FIG. 2 in conjunction with flow chart 300 of FIG. 3, to clearly describe one embodiment of the present invention. However, the method and apparatus of the present invention is well adapted for other structures and communication methods.

With reference to FIG. 2 and to step 310 of FIG. 3, a query for a remote position is initiated. This is done at initiating source 210 of FIG. 2. Initiating source 210 can be, for example, a personal computer, a telephone, or a desktop entry device. While these devices are recited for initiating source 210, the present invention is well suited to use a variety of communications devices for initiating source 210. In one embodiment, initiating source 210 is a computer (e.g., computer 100 of FIG. 1) with software operable thereon for initiating a query for the position of a remote paging device and displaying the determined position of the remote paging device on a generated map. In another embodiment, software is provided to initiate a query at initiating source 210, but other software (e.g., mapping software for displaying the determined position of a remote paging device) is stored in another position (e.g., a website).

A user at initiating source 210 provides identifying information. In the present embodiment, identifying information includes the name of the remote paging device or devices to be located and a password to prevent unauthorized persons from determining the position of a given remote paging device. In one embodiment, position service provider 220 is contacted using a regular telephone paging system (e.g., by initiating a telephone call to the position service provider) and instructions are given (e.g., voice commands) to initiate the remote position acquisition process. In another embodiment, position service provider 220 is a website with an interface to facilitate a user query to acquire a remote position.

With reference to FIG. 2 and to step 320 of FIG. 3, position service provider 220 generates a first paging message for remote paging device 240. This paging message is sent to communications network 230 in preparation for transmitting the message to remote paging device 240.

With reference to FIG. 2 and to step 330 of FIG. 3, communications network 230 sends the paging message from position service provider 220 to remote paging device 240. In one embodiment, communications network 230 is a paging terminal. Paging terminals and transmitter equipment, or radio frequency (RF) link systems, are typically provided by paging service providers who incur the cost of building and operating a paging system for organizations that do not want to invest in this type of equipment. The paging terminal serves as an interface to the Public Switched Telephone Network (PSTN). The paging terminal, like private telephone switches, cellular switches, voice messaging systems, etc., are viewed by the PSTN as just another switch and are connected to one or more switches in the PSTN through one or more trunk circuits.

The paging terminal is responsible for receiving, processing, storing and forwarding information from the caller. The paging terminal validates the type of call, determines the authenticity of the subscriber and serves as the interface to the RF network or to other paging terminal within a multi-city paging network. The RF network, often comprised of several transmitters, accepts the data from the paging terminal via telephone lines, RF link or satellite, and decodes the data streams containing the paging data. Upon decoding the data, the transmitter translates the paging data into signals that modulate the RF paging signal at the desired transmit frequency. While a paging communications network is recited, the present invention is well suited to utilize a variety of wireless communications networks.

With reference to FIG. 2 and to step 340 of FIG. 3, remote paging device 240 determines its position. In one embodiment, remote paging device 240 determines its position using a Global Positioning System (GPS) receiver.

While the present embodiment recites using the GPS for determining position, the present invention is well suited for using a variety of systems for determining its position.

With reference to FIG. 2 and to step 350 of FIG. 3, remote paging device 240 sends its determined position back to communications network 230. This is the position determined in step 340 of FIG. 3. In one embodiment, remote paging device 240 is operating in a "reciprocating" mode. In the reciprocating mode, remote paging device 240 automatically determines its position and sends its position to communications network 230 upon receiving a properly addressed position query. As no remote user input is necessary for this to occur, remote paging device 240 does not need any type of display area or user input features, thus reducing its size. This small size makes it possible to use remote paging device 240 for a variety of applications such as tracking shipments of goods, animal tracking, or locating lost children.

In another embodiment, remote paging device 240 is operating in an "interactive" mode. In this mode, a remote user is notified by remote paging device 240 that a position query is in progress and presented with the option of responding to this query or not. If the remote user chooses not to respond, no position information will be provided and flow chart 300 ends at this point. If the remote user chooses to respond, remote paging device determines its position and process of flow chart 300 continues.

With reference to FIG. 2 and to step 360 of FIG. 3, communications network 230 sends the determined position of remote paging device 240 to position service provider 220.

With reference to FIG. 2 and to step 370 of FIG. 3, position service provider 220 presents the position of remote paging device 240 to initiating source 210. In one embodiment, digital data is sent to initiating source 210 and software on a computer system displays this data as a map showing the determined position of remote paging device 240. In another embodiment, position service provider 220 operates a website that is accessed by initiating source 210 and that displays a map showing the determined position of remote paging device 240.

Figure 4:
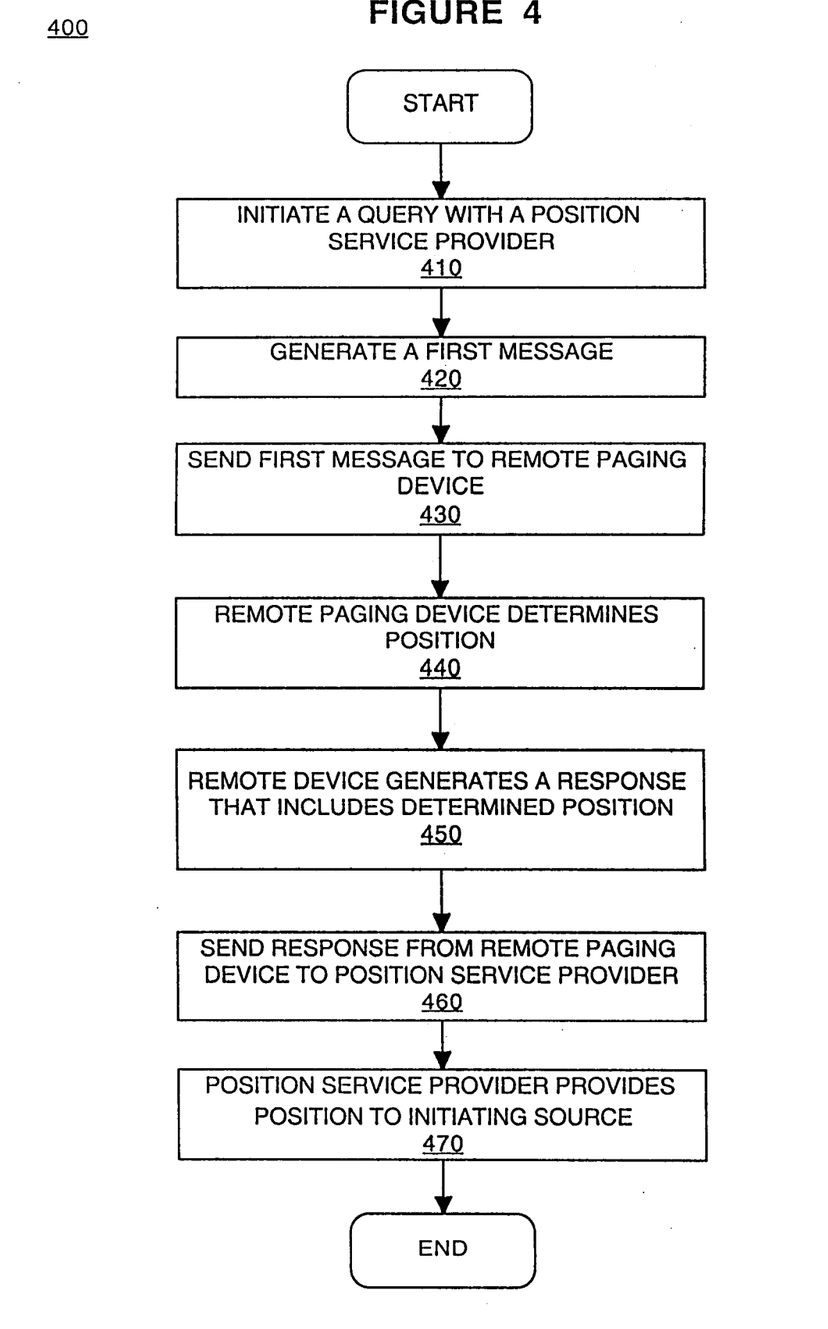
FIG. 4 is a flowchart of the steps involved in a remote position acquisition process in accordance with one embodiment of the present invention.

Flow chart of FIG. 4 illustrates a method for acquiring a remote position in accordance with one embodiment of the present invention. In flow chart 400, remote paging device 240 determines its position and sends its position back to the position service provider when it receives a properly addressed message. For purposes of clarity, the following discussion will utilize the block diagram of FIG. 2 in conjunction with flow chart 400 of FIG. 4, to clearly describe one embodiment of the present invention. However, the method and apparatus of the present invention is well adapted for other structures and communication methods.

With reference to FIG. 2 and to step 410 of FIG. 4, a query for a remote position is initiated. This is done at initiating source 210 of FIG. 2. Initiating source 210 can be, for example, a personal computer, a telephone, or a desktop entry device. While these devices are recited for initiating source 210, the present invention is well suited to use a variety of communications devices for initiating source 210. In one embodiment, initiating source 210 is a computer (e.g., computer 100 of FIG. 1) with software operable thereon for initiating a query for the position of a remote paging device and displaying the determined position of the remote paging device on a generated map. In another embodiment, software is provided to initiate a query at initiating source 210, but other software (e.g., mapping software for displaying the determined position of a remote paging device) is stored in another position (e.g., a website).

A user at initiating source 210 provides identifying information. In the present embodiment, identifying information includes the name of the remote paging device or devices to be located and a password to prevent unauthorized persons from determining the position of a given remote paging device. In one embodiment, position service provider 220 is contacted using a regular telephone paging system (e.g., by initiating a telephone call to the position service provider) and instructions are given (e.g., voice commands) to initiate the remote position acquisition process. In another embodiment, position service provider 220 is a website with an interface to facilitate a user query to acquire a remote position.

With reference to FIG. 2 and to step 420 of FIG. 4, position service provider 220 generates a first paging message for remote paging device 240. This paging message is sent to communications network 230 in preparation for transmitting the message to remote paging device 240.

With reference to FIG. 2 and to step 430 of FIG. 4, communications network 230 sends the paging message from position service provider 220 to remote paging device 240. In the present embodiment, communications network 230 is a Bluetooth network. Bluetooth is the code name for a technology specification for small form factor, low-cost, short-range radio links between personal computers (PC's), mobile phones and other devices and appliances. The Bluetooth technology allows cables that connect one device to another to be replaced with short-range radio links. Bluetooth Is targeted at mobile and business users who need to establish a link, or small network, between their computer, cellular phone and other peripherals. Bluetooth connections are generally ad hoc connections made between devices only for the length of time needed to accomplish a specific, perhaps time-limited task. Once the task is completed, the connection is broken.

Bluetooth radio technology can also provide: a universal bridge to existing data networks, a peripheral interface, and a mechanism to form small private ad hoc groupings of connected devices away from fixed network infrastructures. The required and nominal range of Bluetooth is thus set to approximately ten (10) meters. To support other uses, for example the home environment, Bluetooth can be augmented to extend the range to up to 100 meters.

Bluetooth radios operate in the ISM (Industrial, Scientific, Medical) band at 2.4–2.4385 GHz. A spread spectrum frequency hopping transceiver is applied to combat interference and fading. Each packet is transmitted in a different hop frequency. Most of the entire available frequency spectrum is used with 75 hops of one (1) MHz bandwidth.

Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The frequency hopping scheme is combined with fast ARQ (Automatic Repeat Request), cyclic redundancy check (CRC), and Forward Error Correction (FEC) for data.

A Bluetooth communications network can be used in a situation in which a high density of Bluetooth enabled devices may be expected to be found such as a metropolitan area. Other examples include an amusement park or a shopping mall where Bluetooth hubs can be set up at regular intervals to cover the entire area of the facility. Parents could rent a remote paging device 240 for their children and use the present invention to be able to locate the children when necessary. The amusement park could, for example, provide computer terminals where the parents could initiate the position process. In this environment, a Bluetooth communications network could be more efficient at providing a wireless communications network than a paging system. In the event that communications with remote paging device 240 can not established or maintained using the Bluetooth communications network, a paging communications network can be used as an alternate.

With reference to FIG. 2 and to step 440 of FIG. 4, remote paging device 240 determines its position. In one embodiment, remote paging device 240 determines its position using a Global Positioning System (GPS) receiver. While the present embodiment recites using the GPS for determining position, the present invention is well suited for using a variety of systems for determining its position.

With reference to FIG. 2 and to step 450 of FIG. 4, remote paging device 240 sends its determined position back to communications network 230. This is the position determined in step 440 of FIG. 4. In one embodiment, remote paging device 240 is operating in a "reciprocating" mode. In the reciprocating mode, remote paging device 240 automatically determines its position and sends its position to communications network 230 upon receiving a properly addressed position query. As no remote user input is necessary for this to occur, remote paging device 240 does not need any type of display area or user input features, thus reducing its size. This small size makes it possible to use remote paging device 240 for a variety of applications such as tracking shipments of goods, animal tracking, or locating lost children.

In another embodiment, remote paging device 240 is operating in an "interactive" mode. In this mode, a remote user is notified by remote paging device 240 that a position query is in progress and presented with the option of responding to this query or not. If the remote user chooses not to respond, no position information will be provided and flow chart 400 ends at this point. If the remote user chooses to respond, remote paging device determines its position and process of flow chart 400 continues.

With reference to FIG. 2 and to step 460 of FIG. 4, communications network 230 sends the determined position of remote paging device 240 to position service provider 220.

With reference to FIG. 2 and to step 470 of FIG. 4, position service provider 220 provides the position of remote paging device 240 to initiating source 210. In one embodiment, digital data is sent to initiating source 210 and software on a computer system displays this data as a map showing the determined position of remote paging device 240. In another embodiment, position service provider 220 operates a website that is accessed by initiating source 210 and that displays a map showing the determined position of remote paging device 240.

In one embodiment, the first paging message is transmitted as shown in step 430 using the Bluetooth communication network when communication can be completed using the Bluetooth communication network. However, when communication can not be completed using the Bluetooth communication network, the first paging message is sent using a paging communications network. Similarly, the response is transmitted as shown in step 460 using the Bluetooth communication network when communication can be completed using the Bluetooth communication network. However, when communication can not be completed using the Bluetooth communication network, the response is sent using a paging communications network.

Figure 5:
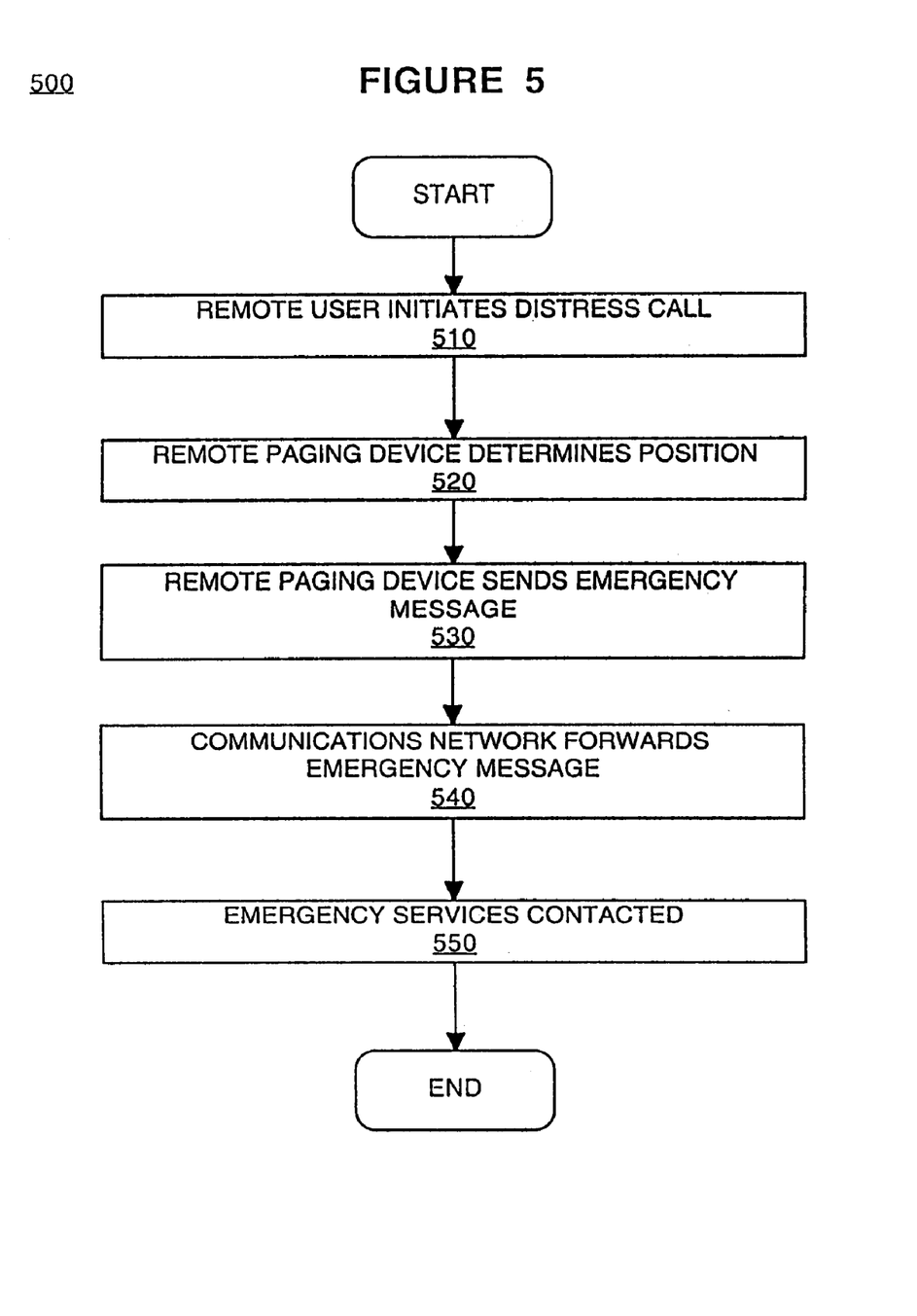
FIG. 5 is a flowchart of the steps involved in a remote position acquisition process in accordance with one embodiment of the present invention.

Flow chart 500 of FIG. 5 describes a process 500 in which a remote paging device 240 is used to generate a distress call in an emergency. For purposes of clarity, the following discussion will utilize the block diagram of FIG. 2 in conjunction with flow chart 500 of FIG. 5, to clearly describe one embodiment of the present invention.

With reference to FIG. 2 and to step 510 of FIG. 5, a remote user initiates a distress call. In the present embodiment, a distress call is initiated by pressing an emergency button on remote paging device 240.

With reference to FIG. 2 and to step 520 of FIG. 5, remote paging device 240 determines its position. In one embodiment, remote paging device uses a GPS receiver to determine its position. While a GPS receiver is recited, the present invention is well suited to utilize a variety of position determination methods.

With reference to FIG. 2 and to step 530 of FIG. 5, remote paging device 240 sends an emergency message to communication network 230 that includes the determined position. In one embodiment, communications network 230 is a paging communications network. In another embodiment, communications network 230 is a Bluetooth communications network. While these networks are recited, the present invention is well suited to utilize a variety of wireless communication networks.

With reference to FIG. 2 and to step 540 of FIG. 5, communications network 230 forwards the determined position of remote paging device 240 and the emergency message to position service provider 220.

With reference to FIG. 2 and to step 550 of FIG. 5, position service provider 220 contacts emergency services and provides the emergency message and determined position of remote paging device 240. In so doing, the present invention has been used as an emergency beacon for a user, generating both an emergency message and the position of the user to emergency services.

Figure 6:
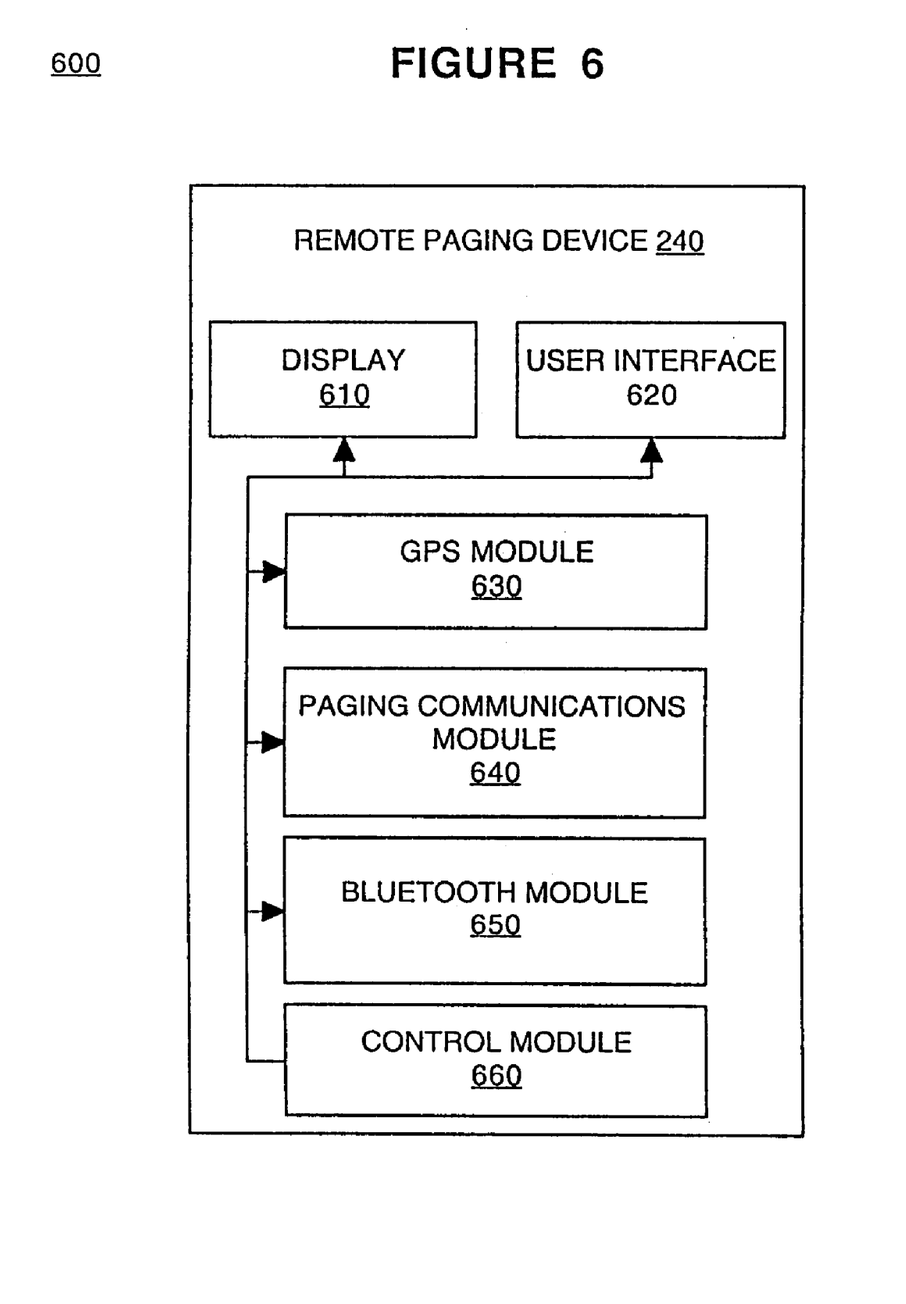
FIG. 6 is a block diagram of an exemplary remote paging device utilized in embodiments of the present invention.

FIG. 6 is a block diagram of an exemplary remote paging device utilized in embodiments of the present invention. Embodiments of remote paging device 240 include a display module 610 for displaying messages and a user interface module 620 for allowing a user to input commands to remote paging device 240. Remote paging device 240 also includes a GPS module 630 for determining position, a paging communications module 640 for communicating over a paging communications network, and a Bluetooth module 650 for communicating over a Bluetooth communications network. Remote paging device 240 further includes a control module 660 for receiving and executing commands for determining position and transmitting that position over a paging or Bluetooth communications network.

Though the remote paging device of FIG. 6 is shown to include display 610 and user interface 620, in one embodiment of the present invention, specifically when remote paging device 240 is utilized in a reciprocating mode, display 610 and user interface 620 are not necessary and may be optionally omitted.

The present invention is a system which allows a user to locate a remote paging device located on a person or piece of property to determine its physical position. A user contacts a position service provider, identifies a device to be located and provides a password. A message is then generated to locate the remote paging device over a communications network. In one embodiment, a paging communications network is used. In another embodiment, the remote paging device is contacted through a Bluetooth communications network. The position of the remote paging device is determined by a GPS transceiver and sent to the position service provider. The position of the remote paging device is then displayed on a map for the user. The remote paging device can also be used to send a distress signal which will provide the position of the sender and automatically be forwarded to emergency services. The present invention provides a capability to communicate in a long distance communications network as well as a short range local communications network.

The preferred embodiment of the present invention, a remote position acquisition system, is thus described. While the present invention has been described in particular embodiments, it should be appreciated that the present invention should not be construed as limited by such embodiments, but rather construed according to the following claims.

What is claimed is:

1. A method for acquiring a remote position comprising:
    providing a remote paging device that includes a Global Positioning System (GPS) receiver, a Bluetooth communication module for communicating over a Bluetooth communications network, and a paging communication module for communicating over a paging communications network;
    initiating a query, wherein an initiating source accesses a web page of a position service provider, said query including identifying information for identifying said remote paging device and conveying a request for the position of said remote paging device;
    sending said query from said position service provider to said remote paging device using said paging communications network, said paging communication module operable to receive said query using said paging communications network;
    determining a position at said remote paging device using said GPS receiver upon receiving said query; and
    sending a response from said remote paging device to said initiating source, said paging communications module operable to send said response using said paging communications network, said response including said determined position.

2. The method for acquiring a remote position as recited in claim 1, wherein said identifying information includes a password.

3. The method for acquiring a remote position as recited in claim 1, wherein said sending of said response further comprises sending a second paging message from said remote paging device to said position service provider using said paging communications system, said second paging message including said determined position.

4. The method for acquiring a remote position as recited in claim 3, wherein said sending of said response further comprises sending said determined position to said initiating source.

5. The method for acquiring a remote position as recited in claim 4, wherein said sending of said determined position further comprises displaying said determined position on said web page of said position service provider.

6. The method for acquiring a remote position as recited in claim 1, wherein said method further comprises:
    initiating a distress call;
    determining the position of said remote paging device;
    sending an emergency message which includes said determined position;
    forwarding said emergency message; and
    contacting emergency services.

7. A method for acquiring a remote position comprising:
    providing a remote paging device that includes a Global Positioning System (GPS) receiver, a paging communication module for communicating over a paging communications network, and a Bluetooth communication module for communicating over a Bluetooth communications network;
    initiating a query, wherein an initiating source accesses a web page of a position service provider, said query including identifying information for identifying said remote paging device and conveying a request for the position of said remote paging device;
    sending said query from said position service provider to said remote paging device using said Bluetooth communications network, said Bluetooth communications module operable to receive said query using said Bluetooth communications network;
    determining a position at said remote paging device using said GPS receiver;
    sending a response from said remote paging device to said initiating source, said Bluetooth communication module operable to send said response using said Bluetooth communications network, said response including said determined position; and
    displaying said determined position on said web page of said position service provider.

8. The method for acquiring a remote position as recited in claim 7, wherein said identifying information includes a password.

9. The method for acquiring a remote position as recited in claim 7, wherein said sending of said response further comprises sending a second message from said remote paging device to said position service provider using said Bluetooth communications system, said second message including said determined position.

10. The method for acquiring a remote position as recited in claim 9, wherein said sending of said response further comprises sending said determined position to said initiating source.

11. The method for acquiring a remote position as recited in claim 7, wherein said method further comprises:
    initiating a distress call;
    determining the position of said remote paging device;
    sending an emergency message which includes said determined position;
    forwarding said emergency message; and
    contacting emergency services.

12. The method for acquiring a remote position as recited in claim 7, further comprising:
    sending a first paging message to said remote paging device using said paging communications network when communication can not be completed using said Bluetooth communications network; and
    sending a response from said remote paging device to said initiating source using said paging communications network when communication can not be completed using said Bluetooth communications network, said response including said determined position.

* * * * *